March 12, 1940.  H. M. PFLAGER  2,193,007
RAILWAY TRUCK
Filed Oct. 23, 1937  3 Sheets-Sheet 1

Inventor
Harry M. Pflager
By Rodney Bedell
Attorney

March 12, 1940.                H. M. PFLAGER                2,193,007
                                RAILWAY TRUCK
                    Filed Oct. 23, 1937          3 Sheets-Sheet 2
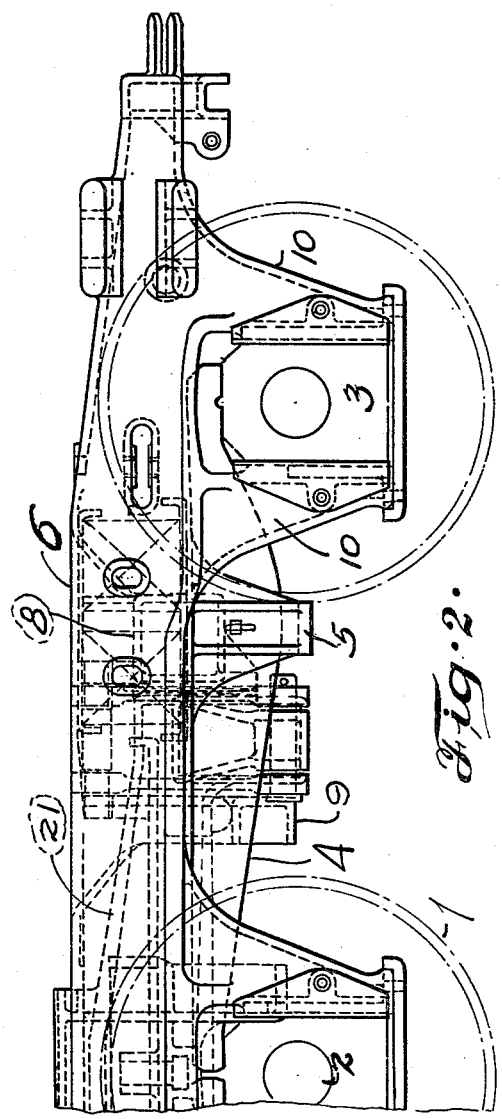
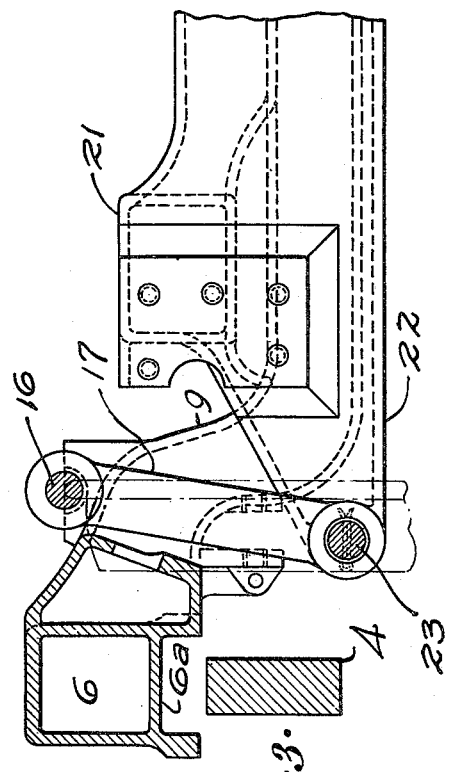
Inventor
Harry M. Pflager
By Rodney Bedell
    Attorney Inventor
Harry M. Pflager
By Rodney Bedell
Attorney Patented Mar. 12, 1940

2,193,007

UNITED STATES PATENT OFFICE 2,193,007

RAILWAY TRUCK

Harry M. Pflager, St. Louis, Mo., assignor to General Steel Castings Corporation, Granite City, Ill., a corporation of Delaware Application October 23, 1937, Serial No. 170,562

14 Claims. (Cl. 105—188)

The invention relates to railway rolling stock and consists in a truck structure particularly adapted for heavy loads in train equipment such as may be required, for example, in tender trucks.

The object of the invention is to provide a simple, strong, light weight, equalized truck structure which will include a lateral motion bolster but will avoid the necessity of the usual spring plank and associated parts.

It is a further object of the invention to provide in a truck of this type adequate spring mounting of the truck frame and simple means for dampening the spring action.

The attainment of these and other detailed objects will be apparent from the following description, reference being had to the accompanying drawings, in which—

Figure 2 is a side elevation of the structure shown in Figure 1.

Figures 3, 4 and 5 are detail sections taken on the corresponding section lines of Figure 1.

Figure 1:
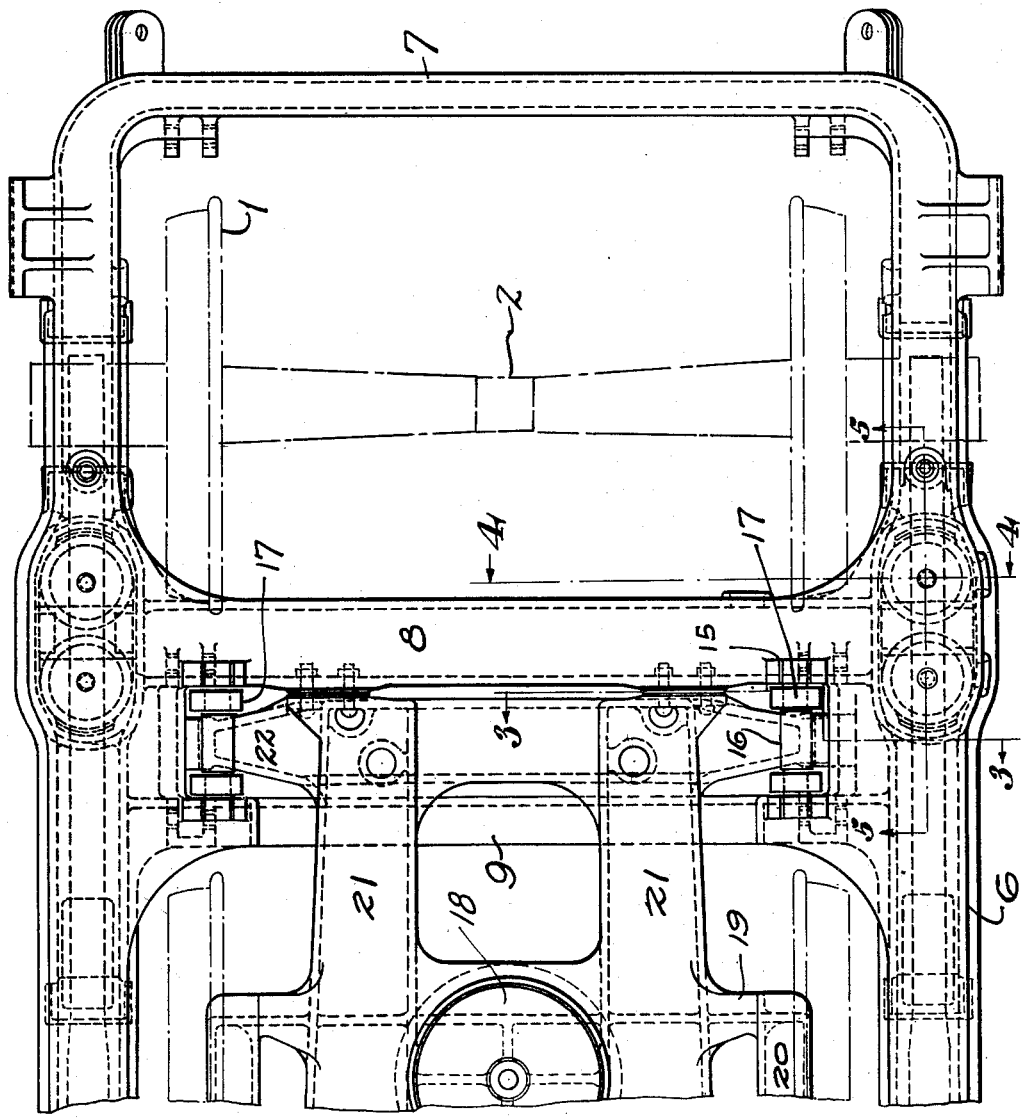
Figure 1 is a top view of one longitudinal half of a truck structure embodying the invention.

The truck includes wheels 1, axles 2, journal boxes 3, straight equalizers 4 extending between and carried on journal boxes 3 and provided with spring saddles 5.

Figure 4:
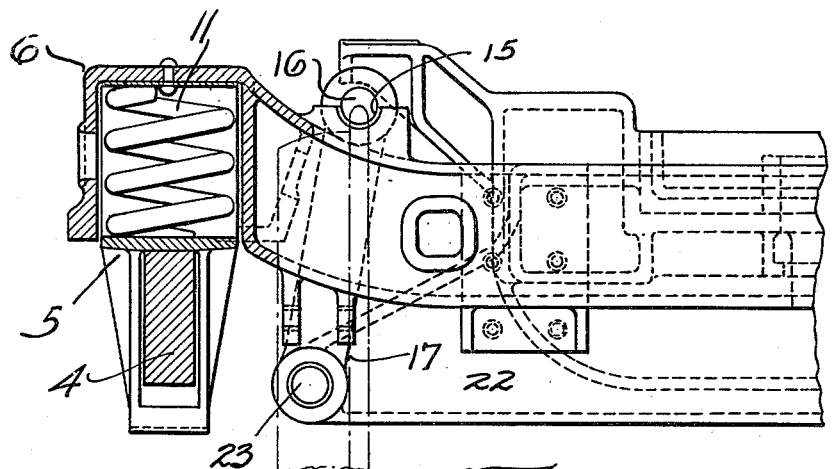

The truck frame is of generally rectangular contour with wheel pieces 6, end cross members 7, transverse transom elements 8 and 9, and integral pedestal legs 10. Wheel pieces 6 are of box section, as best indicated in Figure 3, throughout the major portion of their length but adjacent the ends of transom elements 8 the lower walls 6a are interrupted for a short distance, as best indicated in Figure 4, and at these points the wheel pieces receive the coiled springs 11 which rest upon the saddles 5 and yieldingly support the frame. The equalizers and wheel pieces are substantially straight, horizontal elements in close proximity to each other.

Figure 5:
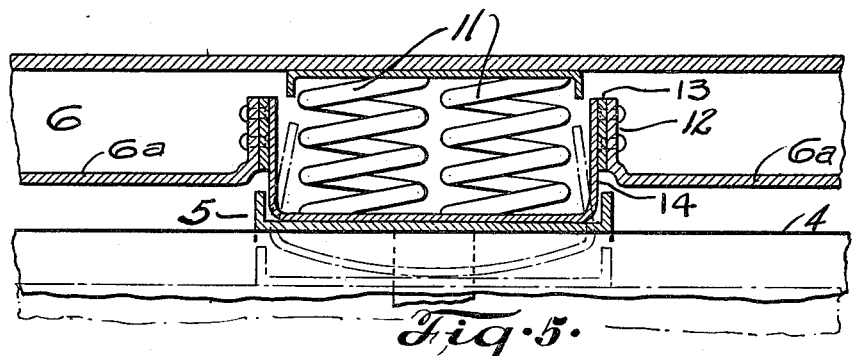

Preferably the bottom wall 6a of the wheel piece adjacent the spring receiving opening includes upstanding webs 12 with renewable wear plates 13 secured to their opposing faces. A snubber plate 14 has an original contour corresponding to that shown in dot and dash lines in Figure 5 but, when subjected to the weight of the springs and the load thereon, assumes the full line position with its upturned ends frictionally engaging wear plates 13 to yieldingly resist the relative vertical movement of the wheel piece and equalizer.

At each side of the truck, each pair of transom elements 8 and 9 have spaced bearings 15 for pins 16 which pivotally suspend a hanger unit comprising spaced links 17 with a pin 23 between their lower ends and located at about the level of the bottom face of equalizers 4.

The truck bolster comprises a body portion having a center plate 18 with lateral brackets 19 the outer ends of which are at substantially the same level as the frame wheel pieces and provide the truck side bearings 20. The body also includes longitudinal arms 21 extending over transom elements 9 and merging with transverse cross bolster 22 located between transom elements 8 and 9 and having their ends pivotally connected directly to swing hanger pins 23, the usual spring plank and additional bolster leaf springs being eliminated without affecting the easy riding qualities of the truck since the action of the snubbers 12—13—14 avoids undesirable oscillations of the truck springs similar to the sliding of the leaves of the elliptic springs generally used. The bolster is free to move laterally, due to the action of the swing hangers, to gradually absorb the lateral thrusts between the truck and body.

The bolster arms 21 extend over transom elements 9, which are depressed intermediate their ends to accommodate this arrangement. In the event the swing hanger suspension fails, the downward movement of the bolster will be limited by the engagement of corresponding elements 21 and 9. This arrangement provides greater clearance around, and facilitates access to, the brake beams than structures in which the bolster arms extend beneath the transoms and the bottom of the equalizers. The lower ends of the swing hangers and the corresponding portions of the cross bolsters are at substantially the same level as the axles. Pins 23 pass directly through link 17 and the ends of the cross bolsters, instead of the links being of U-shape and including a cross bar extending beneath the bolster and bolster springs. This arrangement provides an unobstructed space between the wheels extending upwardly from the rail approximately to the level of the axles, whereby the brake beams and brake heads and hangers suspended from brackets B may be located closer to each other than has been customary heretofore with bolster swing hangers positioned in substantially the same vertical plane as the wheels. All of the above features make it possible to provide a truck of the class described with a substantially shorter wheel base than can be attained with the usual spring plank and yoke hangers type of bolster support and this makes for a substantial reduction in the weight of the truck which is highly desirable with the recent trend to lightweight equipment.

Since the wheel pieces are of box-section substantially from end to end, they may be made of less weight and outside dimensions than corresponding members, such as have been previously used, which were arranged to accommodate all of the equalizing parts inside of the wheel pieces. The loads are applied to the truck frame at points immediately adjacent coiled springs which support the load, which also contributes to the use of a lighter wheel piece than can be used where the load is applied to the ends of the wheel piece or at other points spaced from the points of support.

The construction described above is simple and economical but includes a lateral motion bolster yieldingly supported on equalizers which extend between journal boxes.

Figure 6:
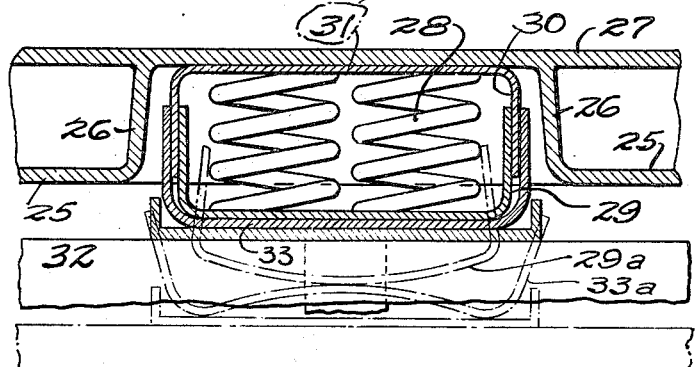
Figure 6 is a detailed section corresponding to Figure 5 but illustrating a modified structure.

Figure 6 illustrates a modification of the equalizer spring housing and snubber arrangement in which the upturned webs 26 of the wheel piece bottom wall 25 merge with the wheel piece top wall 27 and form a more rigid wheel piece structure around the springs 28. The snubber member 29 corresponds generally to that shown at 14 in Figure 5 but the upturned ends, instead of frictionally engaging pads on the wheel piece webs, are thrust against the downturned ends 30 of a spring cap 31. Preferably a third plate 33 cooperates with plate 29 to frictionally grip the downturned ends 30 of plate 31. Plates 29 and 33 have original contours as indicated in the broken lines 29a and 33a, but when subject to the thrust of the load on the springs, the upturned ends of the plates move towards each other to engage the ends 30 of upper plates 31, as indicated in the full line showing. Thus vertical movements of the wheel piece and equalizer 32 are dampened similarly to the arrangement shown in Figure 4.

It will be understood that various other modifications in different features of the structure may be made without departing from the spirit of the invention and the exclusive use of such variations as come within the scope of the claims is contemplated.

I claim:

1. In a railway truck, wheels, axles, journal boxes, an equalizer between the journal boxes and supported thereby, a hollow frame member above said equalizer, a spring between said equalizer and frame member and supporting the latter, and elements on said equalizer and frame member enclosing said spring and frictionally engaging each other to dampen the action of said spring, said spring and dampening elements being housed in said frame member.

2. In a railway truck, wheels, axles, journal boxes, an equalizer between the journal boxes and supported thereby, a hollow frame member above said equalizer, a spring between said equalizer and frame member and supporting the latter, and elements on said equalizer and within said frame member enclosing said spring and frictionally engaging each other to dampen the action of said spring, at least one of said elements comprising renewable wear plate housed in said frame member.

3. In a railway truck, wheels, axles, journal boxes, an equalizer member between the journal boxes and supported thereby, a hollow frame member above said equalizer member, a spring between said equalizer member and extending into said frame member and supporting the latter, a vertical plate element within said frame member adjacent to said spring, a vertical plate element on said equalizer member extending into said frame member, at least one of said elements having yielding sliding contact with the other of said elements to frictionally engage the same to dampen the action of said spring.

4. In a railway truck, wheels, axles, journal boxes, an equalizer between the journal boxes and supported thereon, a frame wheel piece of box section having an opening in its lower wall over said equalizer, said wall including an upstanding member at the edge of said opening, a spring resting on said equalizer and housed in said wheel piece over said opening and supporting said wheel piece from said equalizer, and a normally curved plate on said equalizer for seating said spring and including an upstanding element thrust into frictional engagement with said member by the flattening of said plate by said spring and thereby dampening the action of said spring.

5. In a railway truck, wheels, axles, journal boxes, an equalizer between said journal boxes and supported thereby, a hollow frame member above said equalizer, a spring supporting said frame member on said equalizer, vertically disposed plate-like elements in said frame member and connected to said frame member and equalizer respectively, said elements opposing each other and at least one of said elements being of yielding material and yieldingly slidably engaging the other of said elements to dampen the action of said spring.

6. In a railway truck, wheels, axles, journal boxes, an equalizer between said journal boxes and supported thereby, a frame member above said equalizer, U-shaped plates on said frame member and equalizer facing towards each other and disposed in telescoping relation and normally shaped to hold the adjacent legs of said plates out of contact with each other, at least one of the cross bars of said plates being curved, and a spring with its opposite ends engaging respective cross bars and under pressure straightening the curved cross bar to thrust adjacent legs of said plates into contact with each other and thereby dampen the action of the spring.

7. In a railway truck, wheels, axles, journal boxes, an equalizer member between the journal boxes and supported thereby, a frame member above said equalizer member, a spring between said equalizer member and frame member and supporting the latter, vertical elements on one of said members adjacent to said spring, a pair of nested U-shaped plates on the other of said members with their cross bars curved in opposite directions and resting one on the other, said spring being seated against one of said plates, and the adjacent legs of said plates receiving said vertical elements between them, said spring and its load tending to flatten said cross bars and thereby thrust said legs towards each other to yieldingly grip said vertical elements between them and dampen the action of said spring.

8. In a railway truck, wheels, axles, journal boxes, an equalizer member between the journal boxes and supported thereby, a frame member above said equalizer member, a vertical plate element on one of said members, a pair of U-shaped plate elements on the other of said members superimposed on each other with their adjacent legs disposed to receive said first-mentioned plate element between them and with their cross bars normally bent to hold said adjacent legs spaced apart, and a spring supporting said frame member with one end seated against said cross bars and under pressure straightening the same to thrust said adjacent legs towards each other and thereby grip the first-mentioned plate element between them to dampen the action of the spring.

9. In a railway truck, wheels, axles, journal boxes, an equalizer member between said journal boxes and supported thereby, a frame including a wheel piece member above said equalizer member, said wheel piece member being of box-shaped cross section with a portion of its lower wall interrupted to provide a vertical recess, a spring resting on said equalizer member and extending into said recess to support said frame, there being a U-shaped plate on one of said members with its legs extending towards the other of said members and there being a pair of U-shaped plates on the latter of said members with their legs extending toward said first-mentioned member and yieldingly engaging the legs of said first-mentioned plate between them to dampen the action of said spring said plate legs being received through said recess into said frame member alongside of said spring.

10. In a railway spring-plankless truck, wheels, axles, journal boxes, equalizers extending in a substantially straight line between and supported on said journal boxes, springs carried by said equalizers, a frame resting on said springs and including wheel pieces and transverse transom elements connecting said wheel pieces, swing hangers pivotally suspended from said frame, and a bolster having arms extending longitudinally of the truck over the tops of adjacent transom elements and then downwardly throughout the depth of said elements and having laterally extending end portions connected directly to said hangers at substantially the same level as said equalizers.

11. In a railway six wheel, spring-plankless truck, three wheeled axles, journal boxes, equalizers extending between and supported on said journal boxes, springs carried by said equalizers, a frame resting on said springs and including wheel pieces and transverse transom elements extending between said wheel pieces, swing hangers pivotally suspended from said transom elements at points spaced inwardly of the truck from said wheel pieces, and a bolster constructed and arranged to be applied to and removed from an assembled position from the top of the truck while the center axle wheels and boxes are assembled with said frame, said bolster having arms extending longitudinally of the truck over the tops of adjacent transom elements and then downwardly, there being cross bolsters supporting said arms and having their ends directly connected to said hangers with said ends positioned a sufficient distance away from the adjacent portions of said frame to permit unobstructed vertical application or removal of said bolster as described.

12. In a railway truck, wheels and axles, a frame including wheel pieces and cross transoms, swing hangers pivotally suspended from said frame with their lower ends above the level of the bottom of said axles, and a bolster having a load-supporting center portion and arms extending longitudinally of the truck therefrom and cross bolsters located above the level of the bottom of said axles and pivotally connected directly to the lower ends of said hangers whereby the space between the wheels at the side of the truck and below the level of said axles is unobstructed to provide for the operation of brake equipment.

13. In a railway truck, wheels and axles, a frame including wheel pieces and pairs of spaced transom elements extending from wheel piece to wheel piece between adjacent axles and between their ends being depressed beneath the level of said wheel pieces, swing hangers pivotally suspended from said frame with their lower ends terminating at substantially the same level as the lower elements of said transoms, and a bolster having a load-supporting center portion and arms each extending therefrom longitudinally of the truck and over the adjacent transom element and then downwardly, there being a cross bolster between each pair of transom elements located at substantially the same level as said transom elements and with their outer ends pivotally connected directly to said hangers whereby the space beneath said transom elements and bolster is unobstructed by the same for a distance above the rail corresponding to approximately half the diameter of the wheels.

14. In a railway truck, wheels, axles, journal boxes, equalizers extending between and supported on said journal boxes, springs on said equalizers, a frame resting directly on said springs and including side members and transverse members integral therewith, swing hangers pivotally suspended from said transverse elements inwardly from said side members, a bolster comprising a center plate, side bearing structure on said bolster at substantially the same level as the top of said side members and in substantial alignment with said hangers longitudinally of the truck, arms extending longitudinally of the truck from said center plate and over the adjacent transverse members, and cross bolsters extending between said arms and outwardly of the truck therefrom and having their outer ends pivotally connected directly to the lower ends of said swing hangers, said bolster being movable into and from assembled relation with said frame from between said side members and transverse members and through the top of the frame.

HARRY M. PFLAGER.